United States Patent
Przybysz et al.

(10) Patent No.: US 9,450,887 B2
(45) Date of Patent: Sep. 20, 2016

(54) METHODS AND APPARATUSES FOR NOTIFYING AN APPLICATION FUNCTION OF RESOURCE RESTRICTIONS RELATING TO A COMMUNICATION SESSION

(71) Applicant: TELEFONAKTIEBOLAGET L M ERICSSON (PUBL), Stockholm (SE)

(72) Inventors: Hubert Przybysz, Hägersten (SE); David Castellanos, Stockholm (SE); Susana Fernandez Alonso, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 109 days.

(21) Appl. No.: 14/178,645

(22) Filed: Feb. 12, 2014

(65) Prior Publication Data
US 2014/0161072 A1 Jun. 12, 2014

Related U.S. Application Data

(62) Division of application No. 12/738,439, filed as application No. PCT/EP2007/061238 on Oct. 19, 2007, now Pat. No. 8,688,814.

(51) Int. Cl.
| G06F 15/173 | (2006.01) |
| H04L 12/927 | (2013.01) |
| H04W 28/16 | (2009.01) |
| H04W 80/04 | (2009.01) |
| H04W 88/00 | (2009.01) |

(52) U.S. Cl.
CPC ............ *H04L 47/805* (2013.01); *H04W 28/16* (2013.01); *H04W 80/04* (2013.01); *H04W 88/005* (2013.01)

(58) Field of Classification Search
USPC .......................................................... 709/223
See application file for complete search history.

(56) References Cited

U.S. PATENT DOCUMENTS

| 6,636,502 | B1 | 10/2003 | Lager et al. |
| 2002/0093925 | A1 | 7/2002 | Chuah |
| 2007/0249339 | A1 | 10/2007 | Tamura et al. |
| 2007/0281699 | A1 | 12/2007 | Rasanen |
| 2008/0019299 | A1* | 1/2008 | Lekutai et al. ............... 370/328 |
| 2008/0046963 | A1 | 2/2008 | Grayson et al. |
| 2008/0119160 | A1 | 5/2008 | Andriantsiferana et al. |
| 2008/0273553 | A1* | 11/2008 | Wang et al. .................. 370/468 |
| 2009/0141625 | A1 | 6/2009 | Ghai et al. |

OTHER PUBLICATIONS

3GPP, General Packet Radio Service:Service Description, Stage 2, 1999 pp. 1-181.*

(Continued)

Primary Examiner — Esther B Henderson

(57) ABSTRACT

The invention relates to a method of notifying an Application Function (AF) in a communications network of resource restrictions relating to a communication session. The network includes a Policy and Charging Rules Function (PCRF) for authorizing and controlling flows of data in the session. In the method the AF sends an authorization request to the PCRF for establishing the communication session. The authorization request includes an indication that the AF is to be notified of resource restrictions for the data flows in the session. The PCRF notifies the AF of the resource restrictions.

9 Claims, 5 Drawing Sheets

(56) References Cited

OTHER PUBLICATIONS

3GPP. Digital Cellular Telecornmun1cations Systems (Phase 2+): Universal Mobile Telecommunications System (UMTS): General Packet Radio Service (GPRS): Service Description; Stage 2. 3GPP TS 23.060 version 7.5.0 Release 7. ETSI Standards. Sophia Antipolis Cedex, France. Sep. 26, 2007.

3GPP. Digital Cellular Telecommunications Systems (Phase 2+): Universal Mobile Telecommunications System (UMTS): Policy and Charging Control Architecture. 3GPP TS 23.203 version 7.4.0 Release 7. ETSI Standards, Sophia Antipolis Cedex. France. Oct. 2007.

3GPP. $3^{rd}$ Generation Partnership Project: Technical Specification Group Core Network and Terminals: Policy and Cl1arging Control Signalling Flows and QoS Parameter Mapping (Release 7).3GPP TS 29.213 v7.2.0. France. Sep. 2007.

"Digital Cellular Telecommunications system (Phase 2+): Universal Mobile Telecommunications System (UMTS), General Packet Radio Service (GPRS): Service description; Stage 2 (3GPP TS 23.060 version 7 .5.0 Release 7): ETSI TS 123 060" ETSI Standards, Lis. Sophia Antipolis Cedex, France. val. 3•SA2, No. V7.5.0, Sep. 26, 2007, pp. 1-218.

\* cited by examiner

METHODS AND APPARATUSES FOR NOTIFYING AN APPLICATION FUNCTION OF RESOURCE RESTRICTIONS RELATING TO A COMMUNICATION SESSION

RELATED APPLICATIONS

This application is a divisional of co-pending U.S. patent application Ser. No. 12/738,439 filed on Apr. 16, 2010, which is a 371 of International Application No. PCT/EP2007/061238, filed Oct. 19, 2007 the disclosures of which are incorporated herein by reference in their entireties.

TECHNICAL FIELD

The invention relates to methods and apparatus that enable user equipment to be notified of resource restrictions in a multimedia communications network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. As the number of basic applications, and the media which it is possible to combine, increases, so will the number of services offered to the end users, giving rise to a new generation of personalised, rich multimedia communication services. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS 3 fits into the mobile network architecture in the case of a GPRS/PS access network. As shown in FIG. 1 control of communications occurs at three layers (or planes). The lowest layer is the Connectivity Layer 1, also referred to as the bearer, or traffic plane and through which signals are directed to/from user terminals accessing the network. The GPRS network includes various GPRS Support Nodes (GSNs) 2a, 2b. A gateway GPRS support node (GGSN) 2a acts as an interface between the GPRS backbone network and other networks (radio network and the IMS network). A Serving GPRS Support Node (SGSN) 2b keeps track of the location of an individual Mobile Terminal and performs security functions and access control. Access to the IMS 3 by IMS subscribers is performed through an IP-Connectivity Access Network (IP-CAN). In FIG. 1 the IP-CAN is a GPRS network including entities linking the user equipment to the IMS 3 via the connectivity layer 1.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer.

At the top is the Application Layer 6, which includes the IMS service network 3b. Application Servers (ASs) 7 are provided for implementing IMS service functionality. Application Servers 7 provide services to end-users on a session-by-session basis, and may be connected as an end-point to a single user, or "linked in" to a session between two or more users. Certain Application Servers 7 will perform actions dependent upon subscriber identities (either the called or calling subscriber, whichever is "owned" by the network controlling the Application Server 7).

These session-based applications enable one or more users to participate in interactive user sessions such as video, voice, chat, gaming and virtual reality sessions. The IMS architecture also makes it possible to deploy peer-to-peer applications where two or more users exchange data during a SIP session. Examples of such peer-to-peer applications include Multimedia Telephony (MMTel), Push to Talk over Cellular (PoC), streaming, real-time video sharing, file sharing, gaming etc. The transport connection(s) is (are) negotiated dynamically by means of the SIP/SDP protocol exchange between the two end points (user terminals).

However, in order to support such peer-to-peer applications, there are two basic requirements: (i) a mechanism is needed to selectively control the SIP signal flows associated with the IMS session(s) of a subscriber; and (ii) a functionality is needed to control the IP flows through the dynamically negotiated transport connections in order to apply an effective charging for usage of services. One important aspect concerns the resources required for the session, which will impact on the Quality of Service (QoS) provided for the session (e.g. the data rate at which data is transferred between the end users). In the discussion below the term QoS is used to refer to those parameters of a requested or on-going session that determine the Quality of the Service experienced by the end user. The principal bearer resource affecting QoS is the available bandwidth for the session.

The 3GPP has recognised these needs and has defined a Policy and Charging Control (PCC) Architecture (see 3GPP Technical Specification 23.203). FIG. 2 presents the basic outline of the PCC architecture. The Application Function (AF) 16 is an element offering applications that require dynamic policy and/or charging control of traffic plane resources. Although the application services are initiated and service characteristics are negotiated at the Application Layer 6 (e.g. by an Application Server 7—see FIG. 1), a CSCF 5 (the P-CSCF) plays the role of the AF 16 at the SIP signalling plane (Control Layer 4). A Policy and Charging Enforcement Function (PCEF) 12 in the Connectivity Layer 1 monitors service data flow and enforces network policy. The PCEF 12 also applies charging based on the monitored data flow and the charging policy applied. This information is provided to an Online Charging System 13 over the Gy interface. As shown in FIG. 2, the PCEF 12 is contained within the access gateway node. Within a GPRS access network, the PCEF 12 is located in the GGSN 2a. Within the Systems Architecture Evolution defined in 3GPP Release 8, the PCEF is located in the Public Data Network (PDN) gateway.

A Policy and Charging Rules Function (PCRF) 14 resides in between the AF 16 and the PCEF 12. The PCRF 14 is the entity that controls charging based on the monitored data flow. The PCRF 14 obtains rules relating to the charging policy to be applied for particular subscribers over the Sp interface from a Subscription Profile Repository (SPR) 18, which includes a database of subscriber information. The PCRF 14 installs these PCC rules at the PCEF 12 over the Gx interface. These ensure that only authorized media flows associated with the requested services are allowed. In addition, the PCC rules installed at the PCEF 12 ensure that the right bandwidth, charging and priority are applied through the right bearer.

Once session characteristics are negotiated between the communication peers and the session characteristics are authorized within the IMS Core Network 3a, the AF 16 provides an authorization of bearer resources over the Rx interface to the PCRF 14 so that the corresponding resource reservation can be authorized at the Connectivity Layer 1. The PCC architecture is used to control the bearer resources and thus guarantee that services are delivered with the right quality—i.e. the quality required for the particular services provided, but also in accordance with the user's access subscription and access operator policies. IP-CAN operators normally apply bandwidth limits in terms of the concurrent bandwidth available to their users at a given moment in time (e.g. 200 kbps bit pipe). Access operators may also limit the bandwidth available for certain access technologies (e.g. for UTRAN access, the maximum bandwidth allowed is 80 kbps). Access network operators may also limit the number of concurrent bearers/services available to their users. When these limitations are reached and the quality for the service cannot be guaranteed, the PCC architecture will reject the bearer resources for the service. In this PCC configuration, the PCRF will inform the AF of the reason for the rejection so that it can take appropriate action (e.g. reject the session, re-negotiate the session, etc.). In scenarios where an AF is not present (Rx is not used), the PCRF will downgrade or even reject a bearer establishment or modification attempt from the UE.

However, these limitations are controlled and managed by the access network (IP-CAN) operator, meaning that the UEs and clients are not aware of them. The UEs in use today include many that support advanced capabilities such as the use of the most up-to-date codecs. In the future UEs will be able to support still more advanced capabilities. These UEs will try to initiate services making use of the highest capabilities they support. For example, an IMS client's UE will normally attempt to initiate a session by offering all the codecs it supports (unless manually configured otherwise), ignoring any bandwidth limitation set by the access operator. Similarly, users may also try to run a number of services on their terminals concurrently. For example, a user may want to download e-mail and transfer files using File Transfer Protocol (FTP) at the same time as having an MMTel video call. In this case, the UE may attempt to establish multiple bearers. The number of bearers that can be active simultaneously is, on the one hand limited by the UE manufacturer's implementation (i.e. the terminal is capable of handling a maximum number of concurrent bearers). On the other hand, there may be a limit imposed by the network on the number of bearers a user is allowed to establish, regardless of the capabilities of the terminal.

In summary—network-based mechanisms are used to control the usage of resources for a session, but UEs may try to maintain multiple concurrent services making use of their most advanced capabilities. This will frequently result in additional control signalling. At the application level a round of Request and Reject control messages may be followed by a re-attempt of the original request using different characteristics (e.g. downgrading of QoS with a request for lower bandwidth, less demanding codecs or restricting use of particular media-types) to try and establish a session without exceeding the access operator's established limits. At the bearer level there will either be a round of Request/Reject control signalling messages or a round of Request/Response messages (accepting a downgraded QoS) potentially followed by a bearer termination if the QoS downgrade is not acceptable for the service delivery.

The present invention has been conceived with the foregoing in mind.

SUMMARY

According to a first aspect of the present invention there is provided a method of notifying user equipment, UE, accessing an IP Connectivity Access Network, IP-CAN, of network resource restrictions. The IP-CAN authorises and controls the provision of network services to the UE. In this method a message originating from the UE is received in the IP-CAN. In response to this message the IP-CAN sends a reply that includes resource restriction information applicable to the provision of network services involving the UE. The resource restriction information is then forwarded to the UE.

The resource restriction information may comprise information about the IP Connectivity Access Network, IP-CAN restrictions that apply. The resource restriction information may comprise bandwidth constraints per user and/or bandwidth constraints per IP-CAN technology type, and/or the maximum number of concurrent bearers per user, and/or the maximum number of concurrent bearers per IP-CAN technology Type and/or any other operator defined restrictions for the use of IP-CAN resources.

It is an advantage that the UE is provided with information about the IP-CAN restrictions set by the access operator so that it can start application sessions and bearer procedures with a high degree of success. In other words, service invocations initiated by the UE will not be rejected, at least not due to IP-CAN resource restrictions being exceeded.

It is a further advantage that the resource restriction information can be conveyed to the UE within current IP-CAN session establishment procedures—for example by making use of the Protocol Configuration Option (PCO) parameter.

Once this information is available in the UE, the UE (maybe assisted by the actual user), is able to adapt service requests so that they fall within the received bandwidth limits (e.g. by requesting less bandwidth, requesting less demanding codecs or restricting use of particular media-types) and/or other IP-CAN session restrictions. The UE may also choose to downgrade or terminate some of the existing flows to make room for the new service request.

In embodiments of the invention, the IP-CAN comprises a Policy and Charging Rules Function, PCRF, for controlling access operator policies and determining the resource restrictions that apply within the IP-CAN to the user of the UE.

In embodiments of the invention, the method further comprises notifying the UE of updated resource restrictions in an IP-CAN session modification request initiated by the IP-CAN or in a response to an IP-CAN session modification request initiated by the UE. Where the IP-CAN is a GPRS network, the IP-CAN session establishment and modification commands may correspond to UE or GGSN initiated PDP Context request/modification procedures that comprise a Protocol Configuration Option (PCO) parameter, which is used to convey the resource restriction information.

In embodiments of the invention, the resource restriction information may be sent to the UE using application level signalling procedures from an Application Function. The Application Function may receive information relating to resource restrictions in the response of an Authorization Request or in an Re-Authorisation Request received from the PCRF over the Rx reference point. The Application Function may be comprised in a Proxy-Call Session Control Function, P-CSCF and the resource restriction information may be pushed down to the UE during SIP registration and re-registration procedures.

In another embodiment the resource restriction information is forwarded to the UE from a Profile Delivery Server, PDS, using SIP signalling. The PDS may be comprised in a Proxy-Call Session Control Function, P-CSCF. The PDS may obtain the resource restriction information from the PCRF or the PDS may be comprised in a PCRF. The UE may subscribe to the PDS to receive notifications of changes of the IP-CAN restriction information.

In embodiments of the invention the PCRF retrieves the resource restriction information from a memory in the PCRF before sending the reply, or retrieves the resource restriction information from another source, for example a Subscription Profile Repository, SPR.

Preferably, the method further comprises storing the resource restriction information at the UE.

According to a second aspect of the present invention there is provided a method of invoking or accepting service requests provided by an IP communications network to a user equipment, UE, accessing the network. In this method, the UE has already been provided with information relating to applicable network resource restrictions. The method includes checking the resource restrictions to ascertain a Quality of Service, QoS, that complies with the restrictions for a desired service request, and then generating, or responding to, a service request message that includes a specification of resources for the QoS. The service request or response message is then sent to the network.

The specification of resources for the QoS may comprise service characteristics that lie within the restrictions established for the IP-CAN. When after checking the resource restrictions the UE is unable to ascertain a QoS that complies with the restrictions, the UE either abandons the attempt to invoke or accept a service request, or adjusts the QoS of the service request by determining a revised set of QoS parameters that comply with the restrictions. The revised set of QoS parameters may be determined either by a Mobile Terminal in the UE, the Mobile Terminal establishing or modifying IP-CAN bearers according to QoS characteristics that lie within the IP-CAN restrictions, or by a client application in the UE 10, which adjusts the session request so that it complies with the IP-CAN restrictions. The UE may revise the QoS parameters on the basis of prioritised services, the revision of QoS parameters comprising downgrading or terminating one service in favour of another based on the service priorities. The UE may either prioritise the services based on pre-configured user preferences, or poll the user to determine the prioritisation of services.

According to a third aspect of the present invention there is provided User equipment, UE, configured to participate in a communication session by accessing an IP-CAN. The IP-CAN authorises and controls the provision of network services to the UE, and applies resource restrictions to the services provided to the UE. The UE comprises a processor and a transceiver for sending messages to and receiving messages from the network. The UE is configured to: generate and send a request message to the network; receive from the network a reply in response to the request message, wherein the reply comprises information identifying the resource restrictions applicable to the UE; and generate a request for the provision of a service in accordance with the resource restrictions.

The UE preferably comprises a mobile terminal and one or more client applications. Preferably, the UE further comprises a memory for storing the information identifying the resource restrictions, and the processor checks the resource restriction information in the memory to ascertain a revised set of QoS parameters that comply with the restrictions. The memory in the UE may comprise a store of prioritised services to be used as a basis for ascertaining the revised QoS parameters.

According to another aspect of the present invention there is provided a Policy and Charging Rules Function, PCRF, in an IP communications network configured to authorise and control the provision of network services to UEs communicating over the network. The PCRF includes: means for receiving a message indicating that a UE is requesting notification of network resource restrictions applicable to services provided to the UE; means for identifying the network resource restrictions; and means for sending a message comprising information identifying the resource restrictions.

The message indicating that the UE is requesting the resource restriction information may correspond to either a Diameter Authorization Request received over a Rx reference point or a Diameter Charging Control Request received over a Gx reference point. The message comprising information identifying resource restrictions may correspond either to a Diameter Re-Authorisation Request sent over a Rx or Gx reference point or a Diameter Charging Control Answer sent over the Gx reference point.

BRIEF DESCRIPTION OF THE DRAWINGS

Embodiments of the invention are described below with reference to the drawings, in which.

DETAILED DESCRIPTION

Figure 1:
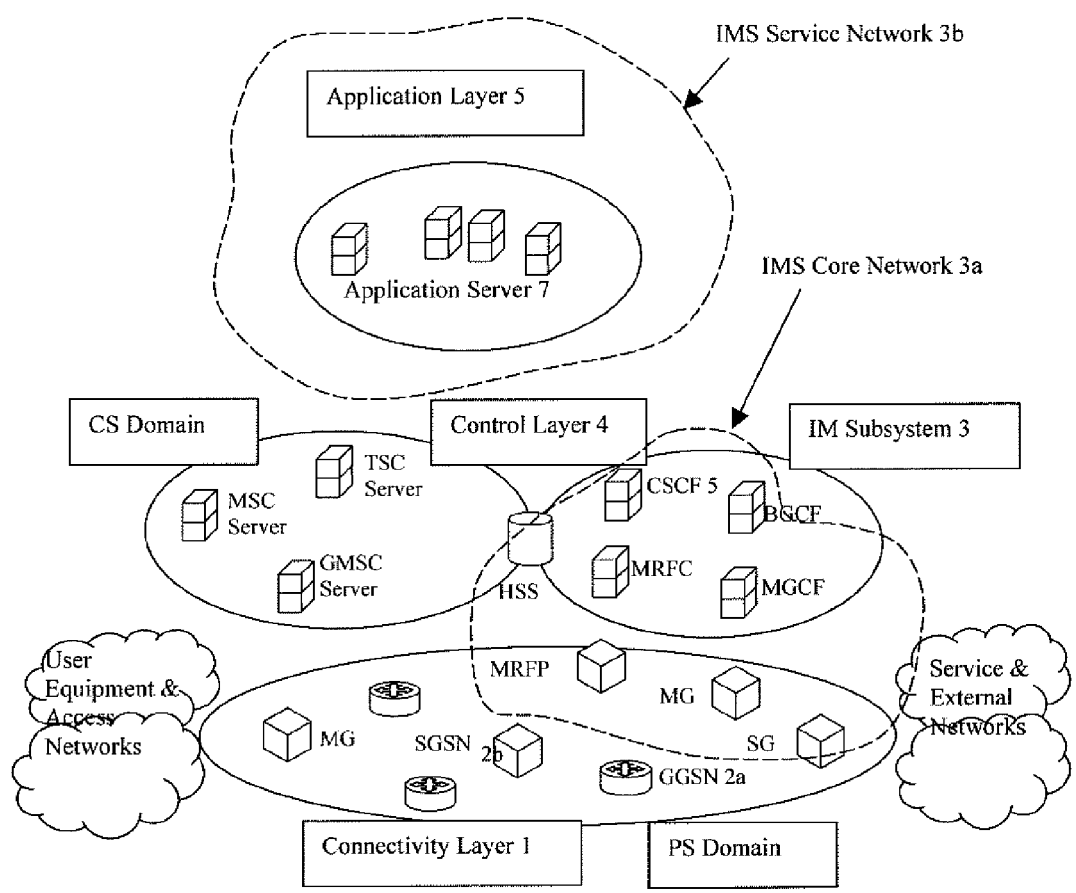
FIG. 1 is a schematic illustration of a GPRS/PS access network showing how the IMS fits into the mobile network architecture.
Figure 2:
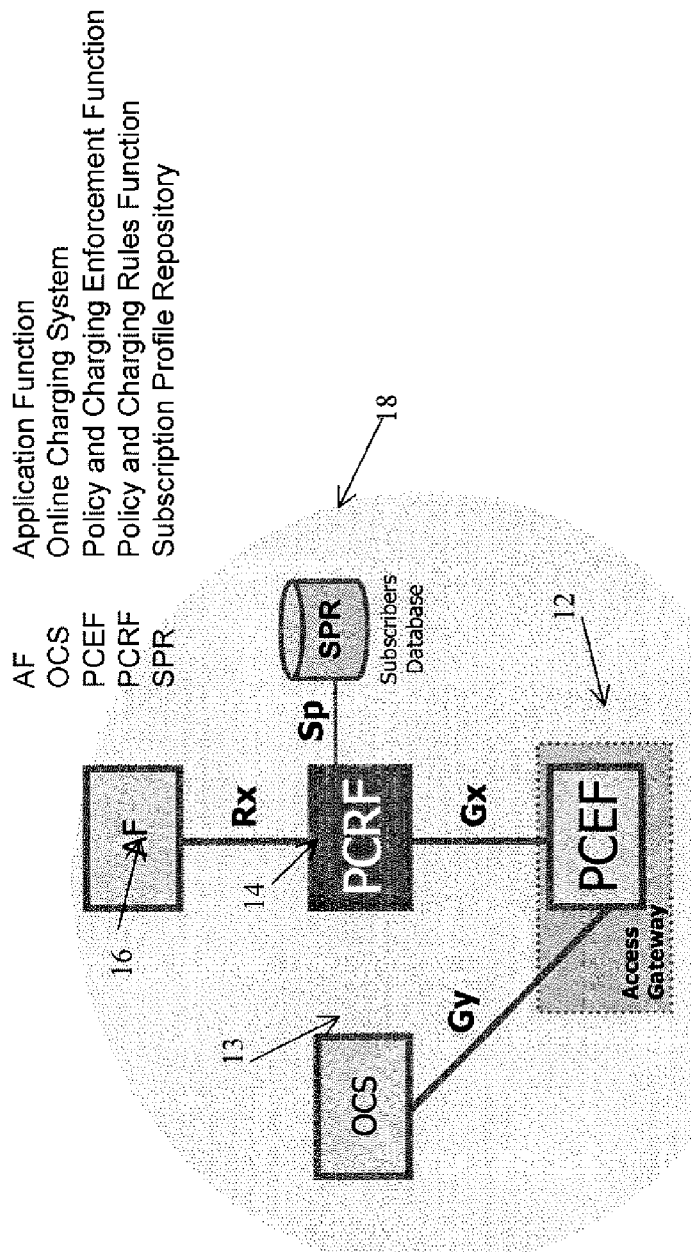
FIG. 2 is a schematic illustration of the network entity architecture a Policy and Charging Control (PCC) system.
Figure 3:
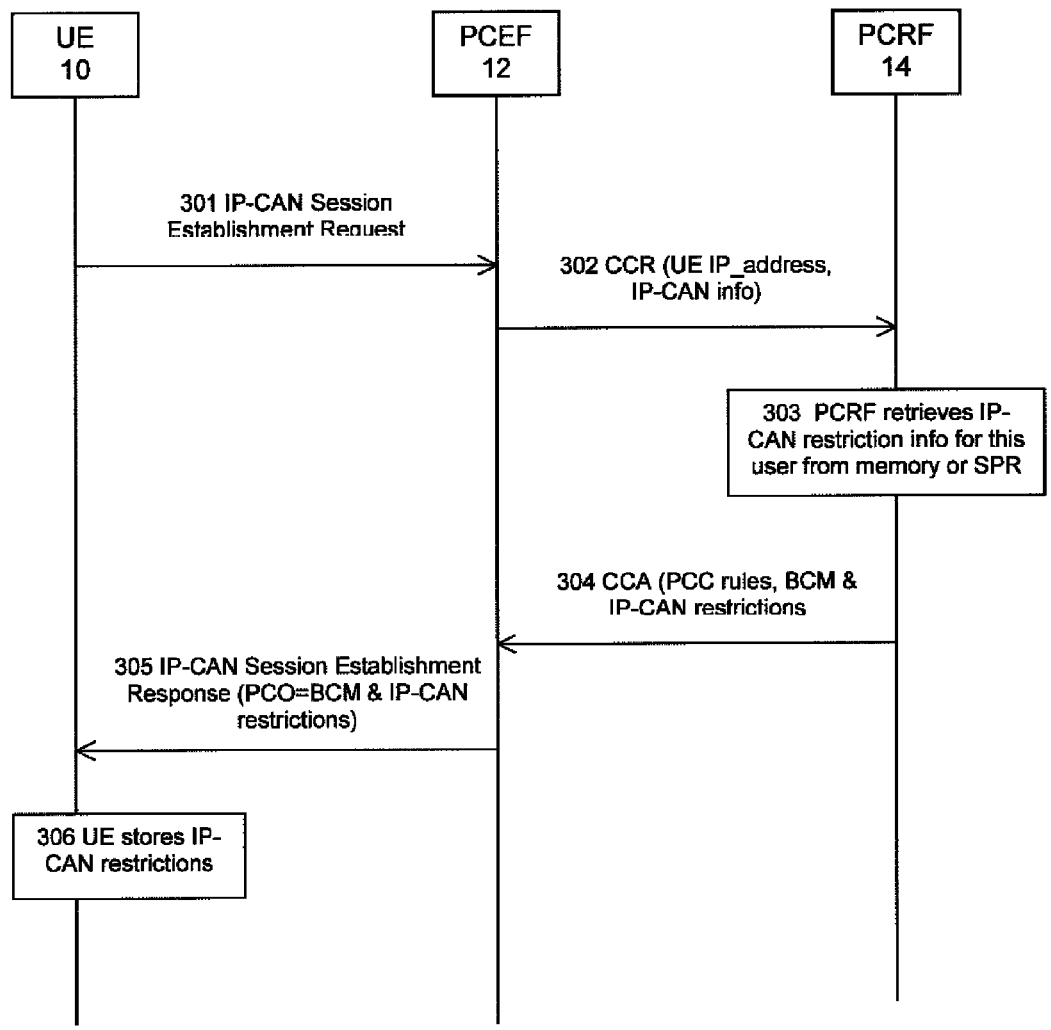
FIG. 3 is an illustration of the signal flows between a UE and PCC entities in accordance with one embodiment of the invention.

FIG. 3 illustrates the signal flows between the PCC nodes (as shown in FIG. 2) for a user terminal (UE) 10, such as a mobile terminal, which has registered with the IMS via an IP Connectivity Access Network (IP-CAN). At step 301, the UE attempts to connect to the IP Connectivity Access Network (IP-CAN) by sending a Session Establishment Request to the IP-CAN, which is received at the PCEF 12. For a GPRS IP-CAN (as shown in FIG. 1), the PCEF 12 is the GGSN 2, and this UE request corresponds to a first PDP Context request. A PDP (Packet Data Protocol) Context is a logical association between a UE or Mobile Terminal and a PDN (Public Data Network) running across a GPRS network. The PDP Context defines aspects such as Routing, QoS (Quality of Service), security, billing etc. At step 302 the PCEF 12 sends a Diameter Charging Control Request (CCR) message to the PCRF 14 over the Gx reference point (as defined in 3GPP TS 29.212). This includes the IP address of the UE 10 requesting the session, and according to this embodiment it also includes a request to be provided with IP-CAN restriction information.

In this embodiment, the PCRF 14 manages the access operator policies, including the restrictions that apply to the usage of IP bearer resources. In one embodiment the PCRF 14 includes a memory storing the IP-CAN restriction information. Thus, at step 303, the PCRF 14 retrieves the restriction information from its memory. In another embodiment, the PCRF is configured, on receiving the request for IP-CAN restriction information, to retrieve this information at step 303 from another source, for example the SPR 18 (see FIG. 2).

At step 304, the PCRF returns a Diameter Charging Control Answer (CCA) message to the PCEF. The CCA message, as currently configured, includes the pre-defined PCC rules that apply to the IP-CAN session. In addition, in accordance with this embodiment, the CCA message includes information about the restrictions that will apply to the IP-CAN Session. These include the bandwidth constraints (BCM) as well as the information about the IP-CAN restrictions, as requested and retrieved by the PCRF 14.

At step 305, the PCEF 12 sends an IP-CAN Session Establishment Response to the UE 10. This makes use of the Protocol Configuration Option (PCO) parameter, which is an existing parameter within IP-CAN session establishment procedures. According to this embodiment the IP-CAN restriction information is included in the IP-CAN Session Establishment Response using this PCO parameter.

At step 306 the UE stores the information it has received in the IP-CAN Session Establishment Response relating to the IP-CAN restrictions. The UE is then in a condition to make use of this information, as will be described in more detail below.

Examples of the information on IP-CAN Restrictions provided to the UE following the procedures described above include (but are not limited to):

Bandwidth consumption limit per user;
Bandwidth consumption limit per IP-CAN access Technology type—e.g. different limitations that apply for IP-CANs operating in GPRS, GERAN (GSM-EDGE Radio Access Network), I-WLAN (Internet Wireless Local Area Network), DOCSIS (Data Over Cable Service Interface Specifications), etc.;
Maximum number of concurrent bearers (per user/access);
Other operator defined restrictions for the use of the IP-CAN Resources.

Mind that, within current procedures, the GPRS network operator already has some control of the maximum number of concurrent bearers (PDP Contexts in GPRS). The supported PDP Contexts for each subscriber are provided by the Home Location Register (HLR) to the SGSN 2b (see FIG. 1) as part of the procedure when the mobile terminal attaches to the network. The HLR may also specify a maximum number of PDP contexts per subscriber. The SGSN 2b can also set, as a configuration parameter, the maximum number of active PDP contexts it can handle per subscriber based on the SGSN's performance capabilities. However, the operator might still want to limit the maximum number of concurrent PDP context for a particular user based on a dynamic policy control (e.g. based on time of the day) below these rather static restrictions controlled by the HLR and/or SGSN.

In general, the IP-CAN restrictions that the network has informed the UE about during the IP-CAN session establishment are calculated by analyzing certain conditions that do not change very frequently. For example, there can be physical limitations in certain access networks, which mean that the access operator cannot provide more than a certain bandwidth for the IP-CAN session. Subscription data is another factor (e.g. the maximum bandwidth for a subscriber can be dependent on the user category). Although these conditions are not expected to change very often, they can be modified (e.g. the physical conditions could vary if, for example, the user is roaming to a different IP-CAN). Therefore, when changing conditions require the IP-CAN session to be modified, the PCRF will have to determine if the IP-CAN restrictions have been changed and then inform the UE.

In this embodiment, the same PCO-based mechanism that was used during the IP-CAN session establishment is also used to provide the UE with updates to the IP-CAN restrictions. Thus, for GPRS networks the PCO parameter is used to send information about the new restrictions to the UE within a GGSN initiated PDP-Context-Modification Procedure.

Following the approach within this embodiment, the mobile terminal (MT), which takes care of the bearer resources within the UE, provides the IP-CAN Restriction information to the different client applications residing within the UE 10. Moreover, the client applications residing in the UE 10 will have to determine whether or not the service can be executed within the limits imposed by IP-CAN resource restrictions in the bearer layer. If the service cannot be guaranteed within the resource restrictions, the client applications within the UE 10 will decide the specific action to take (e.g. rejection of this or another service, or provide a choice of services to the user, etc). This requires that the interface between the MT and the client applications within the UE allows the authorization of service requests according to the usage restrictions of IP-CAN resources in the bearer layer. For those services that require certain characteristics negotiation between the user and the application that depends on the available resources, the MT part of the UE shall provide acceptable QoS characteristics to run the service so the client application can adjust the request accordingly.

Figure 4:
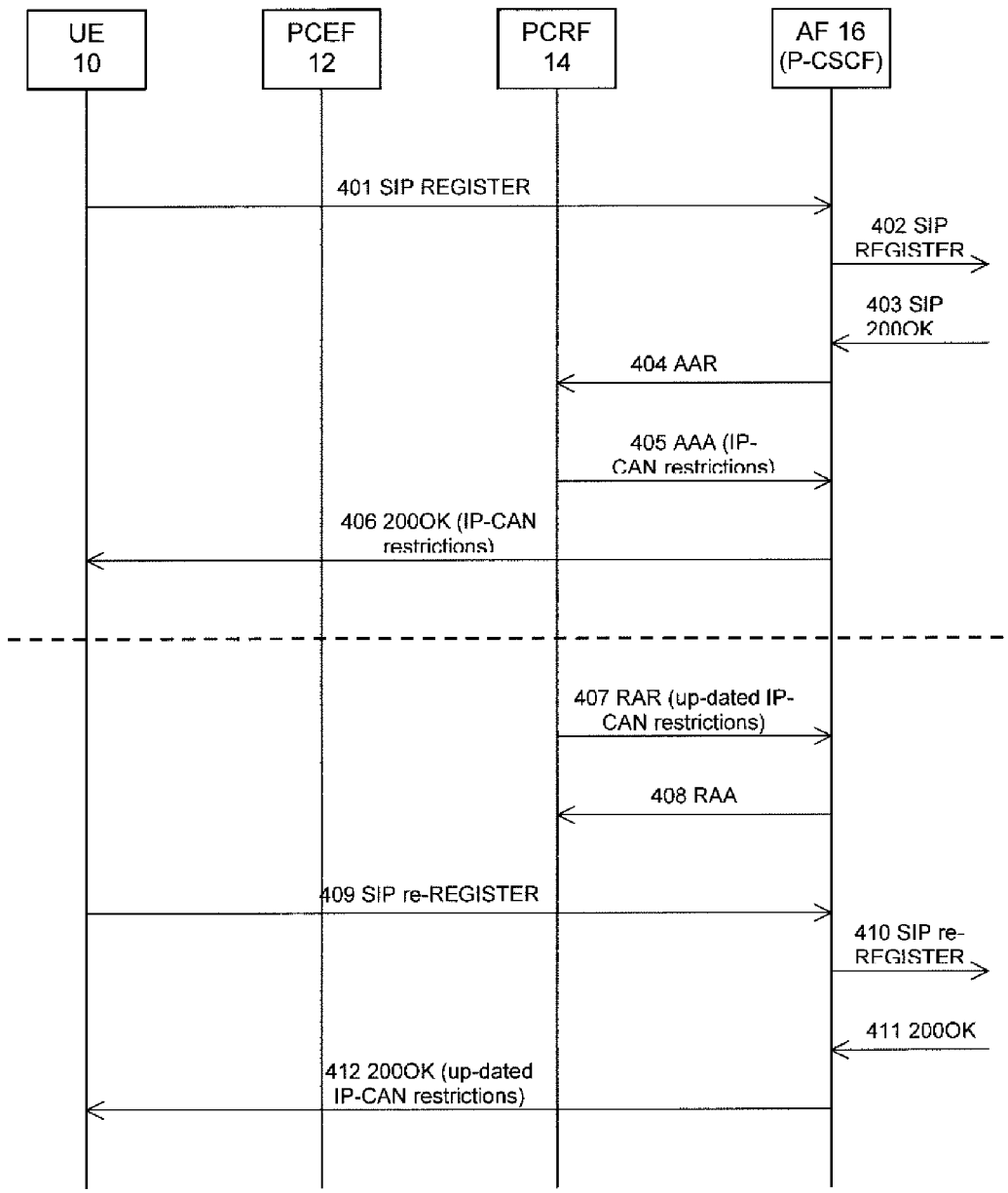
FIG. 4 is an illustration of the signal flows between a UE and PCC entities in accordance with another embodiment of the invention.

FIG. 4 illustrates an alternative method of providing the UE with information about the IP-CAN restrictions set by the access network operator. Instead of providing the information to the UE via IP-CAN signalling procedures as in the previously described embodiments, in this embodiment the IP-CAN restriction information is sent to the UE using Application level signalling procedures (e.g. SIP).

In the embodiment shown in FIG. 4, IP-CAN Restriction information is pushed down to the UE during the SIP Registration process. At step 401, the UE sends the initial SIP Register message to register in the IMS. This is routed to the P-CSCF (which, as explained above, also acts as the AF 16 within the PCC infrastructure). At step 402, the P-CSCF forwards the SIP Register message to the IMS and at step 403, the P-CSCF receives a SIP 200OK response message. Steps 401 to 403 are the normal signal flows for registering the UE in the IMS. Normally at this point the P-CSCF would forward the 200OK message to the UE notifying it of a successful registration. However, in this embodiment of the invention, at step 404, the P-CSCF/AF 16 sends a Diameter Authorisation Request (AAR) message to the PCRF over the Rx interface. At step 405, the PCRF replies with an Authorisation Answer (AAA) message. The AAA message includes information, regarding the IP-CAN resource restrictions. As in the FIG. 3 embodiment, the PCRF either retrieves the information from within a memory in the PCRF, or retrieves it from another source, for example the SPR 18 (see FIG. 2). At step 406, the AF 16 (the IMS P-CSCF) sends the 200OK message, including the information about IP-CAN related policy restrictions within the 200OK successful response.

The benefit of this embodiment is that IP-CAN restriction information can be provided to the UE regardless of the type of IP-CAN. It also avoids internal checking of IP-CAN Restrictions within the UE (i.e. between client applications and the mobile terminal part of the UE) as this information is directly received at the application layer within the UE. The IP-CAN restriction information might be limited in this case to bandwidth limitations as the IMS applications platform within the UE 10 should not need to be aware of other IP-CAN restrictions (for example, the number of maximum concurrent bearers) unless internal interfaces are opened between the application and IP bearer platforms within the UE as proposed in a previous embodiment.

Referring again to FIG. 4, in this embodiment the PCRF notifies the AF/P-CSCF 16 of updated IP-CAN Restriction information via the Rx interface through Diameter Re-Authorisation Request and Answer (RAR/RAA) messages at steps 407 and 408. Later on when the UE re-registers with the IMS by exchanging a SIP re-REGISTER and 200OK messages, as in steps 409-411, the AF/P-CSCF 16 will be able to include the updated IP-CAN Restriction Information received in step 407 in the 200OK message sent to the UE in step 412. UEs have to re-register with the IMS from time to time, and also when the UE is roaming to a different IP-CAN.

In another embodiment, the SIP User Agent (UA) residing in the end-user's UE obtains information about the IP-CAN Restrictions directly from a Profile Delivery Server (PDS). The UA represents the IMS/SIP layer within the UE, which manages the IMS applications and SIP signalling in the UE. The Internet Engineering Task Force, responsible for developing Internet standards, in IETF draft-ietf-sipping-config-framework-12, specifies means for SIP UAs to communicate directly with Profile Delivery Servers.

Accordingly, the UA can contact the PDS directly, and obtain information from it about the configuration. For this embodiment, the configuration information includes the IP-CAN Restrictions. When the UA contacts the PDS for the first time, it informs the PDS that it subscribes to notification (i.e. wishes to be notified) of IP-CAN restrictions in the configuration information it receives. In principle, the UA is able to contact the Profile Delivery Server at any time in order to subscribe to and retrieve notification of changes of IP-CAN restrictions. However, it is also possible that this facility is only made available while the user remains registered within the IMS System. Within the IMS and PCC architecture as shown in FIGS. 1 and 2, either the P-CSCF 5b or a SIP-Enabled PCRF 14 can act as a Profile Delivery Server. If the P-CSCF 5b acts as the Profile Delivery Server, the PCRF 14 provides the IP-CAN Restriction information to the P-CSCF 5b using the same procedures as described above in relation to FIG. 4 (via Rx AAR/AAA and RAR/RAA messages).

This embodiment provides immediate updates of IP-CAN Restriction info to the UE, and is much more efficient (i.e. faster and more frequent) than the method of the FIG. 4 embodiment where notification of the updates must wait for a re-REGISTRATION to take place.

Figure 5:
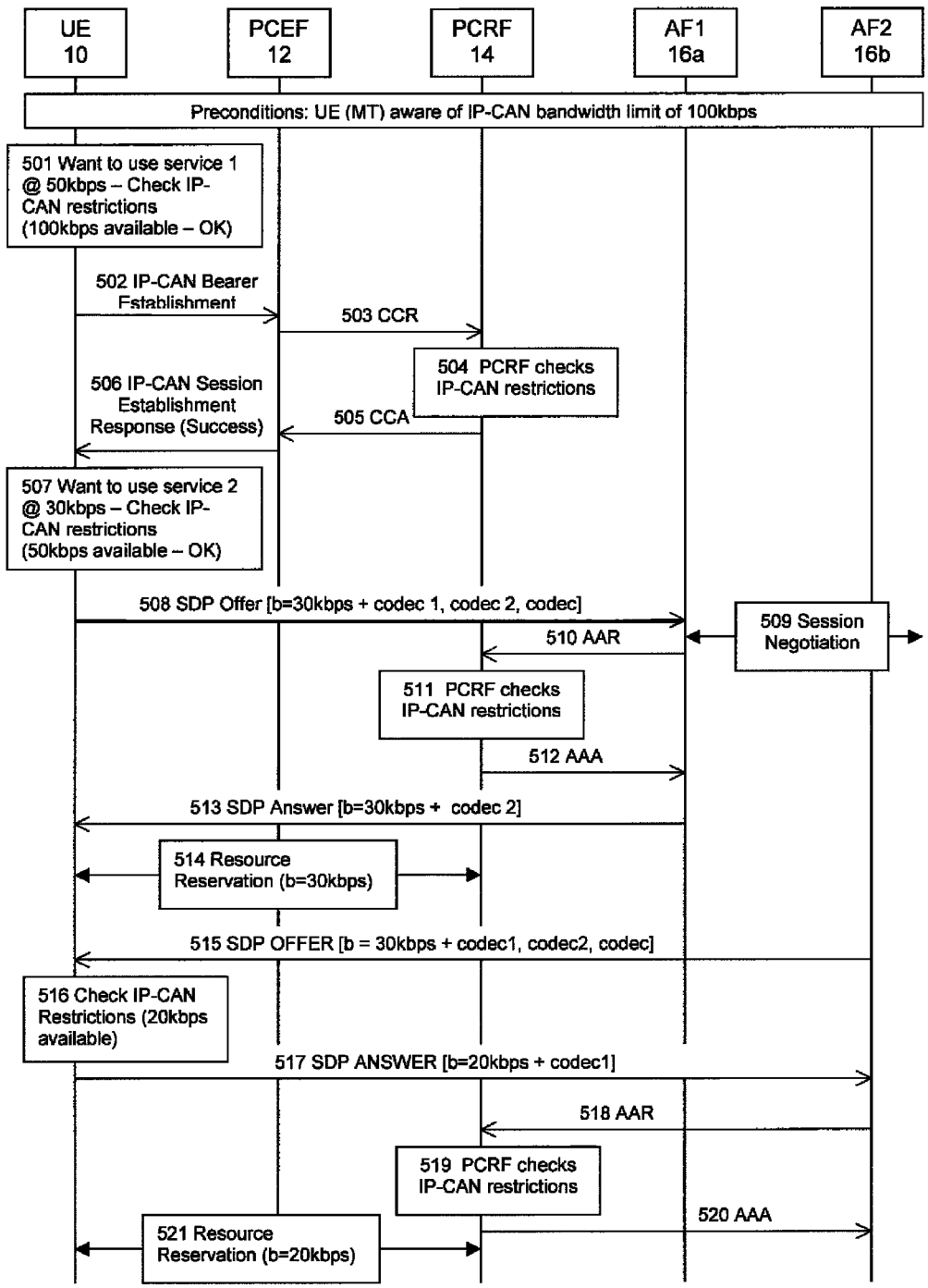
FIG. 5 is an illustration of the signal flows between a UE and PCC entities for an example showing how the UE handles service invocations in accordance with the invention.

The restrictions represent the limits of the IP-CAN resources that the user can make use of for all the active services during an established IP-CAN session. The network will reject an attempt to initiate new services if any of the IP-CAN restrictions are exceeded. Therefore, once the UE has obtained the IP-CAN restriction information it can use this in subsequent requests for services to avoid requests being rejected. Examples showing how the UE makes use of the information are shown in the signal flow diagram of FIG. 5.

At the outset, the UE 10 (comprising the different client applications and mobile terminal handling bearer resources within the UE 10) has registered in the IMS and has been made aware of the IP-CAN restrictions in accordance with one of the methods described above. In addition to the PCC nodes, the example shows two Application Functions, AF1 16a and AF2 16b, providing services to users.

At step 501 the user wishes to initiate a session using service 1 with a bandwidth of 50 kbps. The UE 10 checks the IP-CAN restrictions and notes that the available bandwidth is 100 kbps, which is OK. Thus, at step 502 the UE sends an IP-CAN bearer establishment request to the PCEF 12. This is forwarded at step 503 in the form of a CCR message to the PCRF 14. At step 504, the PCRF checks that the request complies with the IP-CAN restrictions, and at step 505 responds with a CCA message to the PCEF 12. At step 506, the PCEF 14 sends a successful session establishment response to the UE 10.

At step 507, the user wishes to use another service, service 2, with a bandwidth of 30 kbps. Service 2 is provided by the Application Function AF1 16a. The UE 10, knowing the IP-CAN restrictions, checks these to see that there is still 50 kbps of available bandwidth and so, at step 508, sends a SDP Offer to AF1 16a. The offer includes the specified bandwidth, as well as the codecs that the UE supports for this service. At step 509, the offer is negotiated using the established session negotiation procedure. At step 510, AF1 16a sends an Authorisation Request AAR message to the PCRF 14. At step 511, the PCRF 14 checks the IP-CAN restrictions, and because these have not been exceeded, sends a positive Authorisation Answer to AF1 16a. AF1 16a then sends a SDP answer to the UE 10 at step 513, indicating that the requested service 2 will be provided. At step 514, the PCRF 14 reserves the IP-CAN resources for the UE 10.

Thus it can be seen that, when the user tried to initiate a new service, the UE checked to see that the proposed QoS to be requested did not violate any of the restrictions set by the IP-CAN. In the example in FIG. 5, the UE checked whether the bandwidth requested was within the access operator restrictions for usage of IP-CAN Resources. However, there may also be other restrictions that would have needed to be checked, for example: whether a corresponding bearer procedure fits within the limits set by the IP-CAN; and which offered codec would be most suitable considering the available bandwidth.

If the restrictions are not exceeded, the UE 10 will initiate the establishment of the new service in the usual manner. If any of the restrictions are exceeded, the UE will have the option to either abandon the attempt to initiate the service, or adjust the service request so that it complies with the IP-CAN restrictions, if that is possible. Continuing with the example of FIG. 5, at step 515 the UE 10 receives an SDP Offer from Application Function AF2 16b, inviting the user to join a session. The SDP Offer indicates that the preferred QoS for the session requires a bandwidth of 30 kbps with a choice of codecs. At step 516, the UE 10 checks to see if this complies with the IP-CAN restrictions and notes that the available bandwidth is only 20 kbps (because 80 kbps is already reserved for other bearers). In this case, the UE 10 provides an indication that it can participate in the session, but only with a bandwidth of 20 kbps, and the chosen codec 1. In this example, at step 517, the UE sends an SDP answer to the AF2 16b indicating the available bandwidth and chosen codec. The AF2 will then determine if the service can be provided at this reduced QoS. If this is acceptable, the required QoS Resources will be successfully authorized in steps 518-520 and reserved in step 521 since session characteristics now lie within the limits established by the IP-CAN.

When the UE 10 checks the IP-CAN restrictions and discovers that there is insufficient bandwidth for the QoS to be specified within a PDP Context Request or within an SDP offer/answer, according to this embodiment, the UE will have the option to either:

abandon the idea to initiate or accept the service request (e.g. by rejecting an incoming service request or not even attempting the initiation of a new dedicated PDP context to run the service); or adjust the service requirements to the IP-CAN restrictions if possible (e.g. by adjusting the session and media characteristics before sending a service request or adjusting the requested QoS parameters within the request of a dedicated PDP context).

Another possibility is that the UE 10 could prioritize the services, favouring the new service request over other ongoing services. For example, it could decide that the service requested in the SIP INVITE it receives at step 515 has a higher priority than either service 1 or service 2. Accordingly, it could accept the SIP INVITE at the requested bandwidth, and instead reduce the bandwidth, or abandon, one or other of services 1 and 2. If it is not acceptable for the new service requested to have its QoS downgraded, the UE may terminate a lower priority service (e.g. service 1 or service 2) and proceed with the new one. In this case, the UE may prioritise the services based on pre-configured user preferences (e.g. "drop any other service when I do not have enough bandwidth for a new incoming MTSI call").

Another alternative is to make the UE involve the actual user in the decision. For example, if the user is participating in a videoconference, reading his mailbox and accessing a web page and then receives an incoming voice call, the UE can be configured to display a pop-up message on the terminal screen providing a choice for the user to select. For example, the pop-up message could say: "Not enough resources for a new entry call. If accepted your explorer will be dropped. Accept/Deny".

The invention claimed is:

1. A method of invoking or accepting service requests at a user equipment (UE), the method comprising:

accessing an IP Connectivity Access Network (IP-CAN);

prior to sending a service request message, receiving at the UE information relating to network resource restrictions applicable to the UE for the duration of a session between the UE and the IP-CAN;

storing the information related to network resource restrictions applicable to the UE;

prior to sending the service request message or responding to a service request message, checking, at the UE, the resource restrictions to ascertain a Quality of Service (QoS) that complies with the restrictions for a desired service request;

generating or responding to the service request message that includes a specification of resources for said QOS; and sending said service request or response message to said IP-CAN.

2. The method of claim 1, wherein the specification of resources for said QoS comprises service characteristics that lie within the restrictions established for the IP-CAN, so that when after checking the resource restrictions the UE is unable to ascertain a QoS that complies with the restrictions, the UE either abandons the attempt to invoke or accept a service request, or adjusts the QoS of the service request by determining a revised set of QoS parameters that comply with the restrictions.

3. The method of claim 2 wherein the revised set of QoS parameters are determined either by a Mobile Terminal in the UE, the Mobile Terminal establishing or modifying IP-CAN bearers according to QoS characteristics that lie within the IP-CAN restrictions, or by a client application in the UE, which adjusts the session request so that it complies with the IP-CAN restrictions.

4. The method of claim 3 wherein the UE revises the QoS parameters on the basis of prioritised services, the revision of QoS parameters comprising downgrading or terminating one service in favour of another based on the service priorities.

5. The method of claim 4 wherein the UE either prioritises the services based on pre-configured user preferences, or polls the user to determine the prioritisation of services.

6. An User equipment (UE) configured to participate in a communication session by accessing an IP Connectivity Access Network, IP-CAN, wherein the IP-CAN authorizes and controls the provision of network services to the UE and applies resource restrictions to the services provided to the UE, the UE comprising a processor and a transceiver for sending messages to and receiving messages from the IP-CAN, the UE being configured to:

access the IP-CAN;

generate and send a request message to the IP-CAN;

prior to sending a service request message, receive from the IP-CAN a reply in response to the request message, wherein the reply comprises information identifying said resource restrictions applicable to the UE for the duration of the session;

storing the information related to network resource restrictions applicable to the UE;

check the resource restrictions, prior to sending the service request message, to ascertain a Quality of Service (QoS) that complies with the restrictions for a desired service request; and generate the service request message for the provision of a service in accordance with said resource restrictions.

7. The User Equipment of claim 6 comprising a mobile terminal and one or more client applications.

8. The User Equipment of claim 6, further comprising a memory for storing said information identifying said resource restrictions, wherein the processor is configured to check the resource restriction information in the memory to ascertain a revised set of QoS parameters for said service that comply with the restrictions.

9. The User Equipment of claim 8 wherein the memory comprises a store of prioritised services, the processor ascertaining the revised QoS parameters on the basis of said prioritised services.

* * * * *